(12) United States Patent
Schwiertz et al.

(10) Patent No.: US 11,890,857 B2
(45) Date of Patent: Feb. 6, 2024

(54) LOW-VIBRATION CYLINDER

(71) Applicant: Flint Group Germany GmbH, Stuttgart (DE)

(72) Inventors: Martin Schwiertz, Emsbüren (DE); Uwe Müller, Ahaus (DE); Klaus Bennink, Vreden (DE)

(73) Assignee: Flint Group Germany GmbH, Stuttgart (DE)

( * ) Notice: Subject to any disclaimer, the term of this patent is extended or adjusted under 35 U.S.C. 154(b) by 96 days.

(21) Appl. No.: 16/793,625

(22) Filed: Feb. 18, 2020

(65) Prior Publication Data
US 2020/0262193 A1 Aug. 20, 2020

(30) Foreign Application Priority Data
Feb. 20, 2019 (EP) ..................................... 19158348

(51) Int. Cl.
*B41F 3/54* (2006.01)
*B32B 1/08* (2006.01)
(Continued)

(52) U.S. Cl.
CPC .................. *B41F 3/54* (2013.01); *B32B 1/08* (2013.01); *B32B 5/18* (2013.01); *B32B 25/08* (2013.01);
(Continued)

(58) Field of Classification Search
CPC .... B32B 1/08; B32B 5/18; B32B 5/32; B32B 7/12; B32B 9/005; B32B 9/043; B32B 9/046; B32B 15/00; B32B 15/046; B32B 15/06; B32B 15/18; B32B 15/20; B32B 25/045; B32B 25/08; B32B 25/14; B32B 27/00; B32B 27/065; B32B 27/18; B32B 27/20; B32B 27/40; B32B 2250/05;
(Continued)

(56) References Cited

U.S. PATENT DOCUMENTS 5,323,702 A * 6/1994 Vrotacoe ................ B41N 10/04
101/376
5,860,360 A 1/1999 Lane, III et al.
(Continued)

FOREIGN PATENT DOCUMENTS

DE 102014220850 A1 4/2016
EP 0313511 A2 4/1989
(Continued)

OTHER PUBLICATIONS

Shore Hardness Scales, 2019, Smooth-On (Year: 2019).*

*Primary Examiner* — Lee E Sanderson
*Assistant Examiner* — Thomas J Kessler
(74) *Attorney, Agent, or Firm* — Faegre Drinker Biddle & Reath LLP (57) ABSTRACT

The invention relates to a cylinder (10) which is set up for application of at least one hollow cylinder, the cylinder (10) having a layer structure which comprises in this order, from inside to outside, a base layer (12) or a cylinder core, a first compressible layer (14), a filling layer (16), an interlayer (18), a second compressible layer (20) and an outer layer (22), the outer layer forming a lateral surface of the cylinder. The invention further relates to arrangements comprising at least one such cylinder (10) and further cylinders.

19 Claims, 3 Drawing Sheets

(51) Int. Cl.
*B32B 5/18* (2006.01)
*B32B 25/08* (2006.01)
*B32B 25/14* (2006.01)
*B32B 27/06* (2006.01)
*B32B 27/18* (2006.01)
*B32B 27/40* (2006.01)

(52) U.S. Cl.
CPC ............ *B32B 25/14* (2013.01); *B32B 27/065* (2013.01); *B32B 27/18* (2013.01); *B32B 27/40* (2013.01); *B32B 2250/05* (2013.01); *B32B 2262/101* (2013.01); *B32B 2262/106* (2013.01); *B32B 2266/0278* (2013.01); *B32B 2270/00* (2013.01); *B32B 2319/00* (2013.01); *B32B 2375/00* (2013.01); *B32B 2597/00* (2013.01); *Y10T 428/13* (2015.01); *Y10T 428/139* (2015.01); *Y10T 428/1352* (2015.01); *Y10T 428/1369* (2015.01); *Y10T 428/1372* (2015.01); *Y10T 428/1393* (2015.01)

(58) Field of Classification Search
CPC .... B32B 2262/0253; B32B 2262/0261; B32B 2262/0269; B32B 2262/0292; B32B 2262/101; B32B 2262/105; B32B 2262/106; B32B 2266/0228; B32B 2266/025; B32B 2266/0264; B32B 2266/0271; B32B 2266/0278; B32B 2270/00; B32B 2319/00; B32B 2375/00; B32B 2597/00; B41F 3/54; B41F 5/24; B41F 13/08; B41F 13/085; B41F 13/10; B41F 27/05; B41F 27/14; B41P 2200/12; B41P 2227/20; G01H 17/00; Y10T 428/13; Y10T 428/1352; Y10T 428/1369; Y10T 428/1372; Y10T 428/139; Y10T 428/1393

See application file for complete search history.

(56) References Cited

U.S. PATENT DOCUMENTS

| | | | |
|---|---|---|---|
| 9,233,570 B2 * | 1/2016 | Alter | B32B 37/12 |
| 10,471,704 B2 | 11/2019 | Füllgraf et al. | |
| 2004/0103976 A1 * | 6/2004 | Busshoff | B29C 63/20 |
| | | | 156/154 |
| 2016/0121598 A1 * | 5/2016 | Zhou | G03G 15/6585 |
| | | | 101/216 |
| 2019/0143671 A1 * | 5/2019 | Schwiertz | B41F 5/24 |
| | | | 101/375 |

FOREIGN PATENT DOCUMENTS

| | | | | |
|---|---|---|---|---|
| EP | 1263592 B1 | 9/2004 | | |
| EP | 2051856 A2 | 4/2009 | | |
| EP | 3189976 A2 | 7/2017 | | |
| EP | 3243660 A1 * | 11/2017 | ............ | B41F 27/14 |
| WO | WO-99036270 A1 | 7/1999 | | |
| WO | WO-2005110751 A1 | 11/2005 | | |
| WO | WO-2005111725 A1 | 11/2005 | | |
| WO | WO-2007133517 A2 | 11/2007 | | |
| WO | WO-2017089221 A1 | 6/2017 | | |

* cited by examiner

LOW-VIBRATION CYLINDER

CROSS-REFERENCE TO RELATED APPLICATIONS

This application claims priority to European Application No. 19158348.3, filed Feb. 20, 2019, which is incorporated herein by reference in its entirety.

The invention relates to a cylinder which is set up or suitable for application of at least one hollow cylinder and comprises a layer structure having a hard outer layer, the hard outer layer forming a lateral surface of the cylinder.

The invention further relates to arrangements comprising at least two such cylinders.

PRIOR ART

Flexographic printing is a letterpress printing process, where a highly mobile printing ink is transferred from the raised portions of the printing forme onto a substrate. A feature of flexographic printing is the use of flexible printing formes, allowing a host of substrates (paper, cardboard, films) to be printed. Alongside offset printing and gravure printing, flexographic printing is one of the most important printing processes in the packaging industry.

With the flexographic printing machines, a distinction is made between multi-cylinder and central-cylinder printing machines. In the case of a central-cylinder printing machine, the individual printing units are arranged around a central cylinder over which the substrate web is passed. In the case of multi-cylinder printing machines, the individual printing units are arranged in series. The printing units consist of the printing forme cylinder, an engraved roll for inking the printing forme, and an ink trough from which the printing ink goes onto the engraved roll. At its most simple, the printing forme cylinder consists of a steel roll, onto which the flexographic printing forme is adhered.

A great advantage of flexographic printing over other printing processes is its format variability. Through the use of steel cylinders as printing forme cylinders with different diameters, it is possible for different formats to be printed. A term used by the skilled person is that of the repeat length. The repeat length corresponds to the printed length on one complete rotation of the printing forme cylinder. Changing over the heavy steel cylinders, however, takes time. Accordingly, flexographic printing machines are nowadays available with which the repeat length can be altered more simply by means of adaptor sleeves. The adaptor sleeve is engaged onto the steel cylinder. The wall thicknesses of customary adaptor sleeves range from 7 mm to 300 mm. Engaged on the adaptor sleeve subsequently is a printing sleeve, which carries the printing forme, usually premounted. Adaptor sleeves and printing sleeves are nowadays generally also referred to as sleeves. Sleeves are manufactured of plastic. They are significantly lighter than corresponding steel cylinders, and can therefore be changed over much more easily in the printing machine.

The construction of a sleeve is usually as follows (from inside to outside): Over a thin layer of GRP material (GRP=glass fibre-reinforced plastic) is a thin compressible layer, which is covered in turn by a second thin layer of GRP material. This layer system allows the sleeves to be expanded by means of compressed air, and is referred to hereinafter as a GRP base sleeve. The GRP base sleeve customarily has a thickness of 1 mm up to 4 mm. Applied to the GRP base sleeve is a polyurethane foam layer with a thickness of several mm to several cm. The function of this layer is to build up the layer thickness, or to produce the desired repeat length. Usually, the polyurethane foam layer carries a further thin GRP layer or a thin outer layer, to ensure the mechanical and chemical stability of the sleeve.

In order to ensure that the adaptor sleeve is easily engaged, the printing forme cylinders may have air bores which emit a flow of compressed air. As a result of the compressed air, an air cushion is built up, thereby expanding the internal diameter of the adaptor sleeve, and the adaptor sleeve glides over the printing forme cylinder. If the supply of air is halted, the adaptor sleeve clamps to the printing forme cylinder and is fixed firmly on it.

To allow the printing sleeve to be pulled onto the adaptor sleeve, the adaptor sleeve likewise customarily contains an air conduction system. In the prior art there are two known systems here. Either the compressed air is conducted on directly from the printing forme cylinder (bridge system), or there is a separate air connection to one of the end faces of the adaptor sleeve (Airo system).

In the case of the bridge system, the adaptor has air channels which extend from the adaptor sleeve inside to the outside of the adaptor sleeve, thus allowing the compressed air emerging from the printing forme cylinder to also generate an air cushion over the adaptor sleeve. An adaptor sleeve according to the bridge system is known from EP 1 263 592 B1.

In order to achieve high printing speeds without detriment to the printed image, vibrations of the cylinders during the printing process ought to be as little as possible. For this purpose the cylinder ought to have good damping properties. The vibration and damping properties of a cylinder are dependent in particular on its mass and on the physical properties of the materials used. The elasticity modulus in particular has an influence over the resistance that a material presents to deformation, and therefore an influence on damping properties of that material.

Known from WO 2017/089221 A1 is a sleeve which has a dimensionally stable and liquid-impermeable outer layer and a plurality of inner layers. The inner layers comprise, as the innermost layer, a base layer based on a glass fibre-reinforced plastic; a compressible layer; and a build-up layer. In addition to the end faces, the sleeve has a ring of a liquid-impermeable material, with which the end faces are closed off.

DE 10 2014 220 850 A1 describes a printing sleeve which has an inner layer and an outer layer, the outer layer being in contact directly with the inner layer. The inner layer is a compressible layer with glass fibre reinforcement. The outside of the outer layer is designed as a printing surface.

EP 3 189 976 A2 discloses a printing sleeve with a base layer made from a stretchable material, a layer reinforced with fusible polymer cords, and a printing surface layer. During a heat treatment the fusible polymer cords are melted. There may additionally be infusible cords embedded in the reinforced layer, and there may be a further layer, comprising non-fusing cords, disposed between the base layer and the reinforced layer.

Known from EP 2051856 is an adaptor sleeve with integrated gas channel. The adaptor sleeve has a base layer, a reinforcing layer, a barrier layer and a surface layer. The base layer may be made of a metal or a polymer. The reinforcing layer is a foamed polyurethane layer, in which the gas channel is integrated. The barrier layer may be implemented as a fibre-reinforced polymer material. The surface layer comprises a polymer such as polyurethane.

WO 2005/110751 A1 and WO 2005/111725 A1 disclose printing sleeves which have a base sleeve, a cushioning layer, a barrier layer and a photopolymerizable layer. The base sleeve and the cushioning layer here are transparent to radiation which is suitable for curing the photopolymerizable layer.

US 2004/0103976 A1 describes a printing sleeve having a fibre-reinforced, thin-walled base sleeve, a compressible layer disposed thereon, and an imageable layer.

Known from WO 99/36270 and U.S. Pat. No. 5,860,360 are sleeves which have an inner polymer layer, a fibre-comprising reinforcing layer, a polymer interlayer, a cushioning layer and an outer polymer layer. The inner polymer layer has a hardness in the range from 65 to 90 Shore A. The cushioning layer has a hardness in the range from 25 to 55 Shore A. Disposed between the individual layers there may be additional layers of adhesive.

DISCLOSURE OF THE INVENTION

A cylinder is proposed which is set up or suitable for application of at least one hollow cylinder, the cylinder having a layer structure which comprises in this order, from inside to outside, a base layer or a cylinder core, a first compressible layer, a filling layer, an interlayer, a second compressible layer and an outer layer, the outer layer forming a lateral surface of the cylinder.

The cylinder may be configured as a solid cylinder or as a hollow cylinder. If configured as a solid cylinder, the cylinder comprises a cylinder core on which the other layers of the layer structure of the cylinder are disposed. The cylinder core may be solid in implementation, or alternatively may also have cavities.

If configured as a hollow cylinder, the cylinder has as its innermost layer the base layer, on which the other layers of the layer structure of the cylinder are disposed. The cylinder may be configured as a printing forme cylinder. Possible embodiments of the printing forme cylinder include its configuration as a hollow cylinder or as a solid cylinder, and the printing forme cylinder is set up in particular to accommodate printing sleeves and/or adaptor sleeves on the lateral surface of the printing forme cylinder.

The cylinder may be configured as an adaptor sleeve or as a printing sleeve. In this case the cylinder is usually a hollow cylinder, with the base layer having an inside which confines the hollow cylinder. The printing sleeve is preferably a flexographic or lithographic printing sleeve. The outer layer of the printing sleeve in this case is set up or suitable in particular so as to allow a printing plate to be adhered to the outer layer.

The cylinder preferably has at least one further interlayer, in which case the at least one further interlayer is disposed between the first compressible layer and the filling layer and/or between the second compressible layer and the outer layer.

The cylinder may, for example, therefore have a layer structure which comprises in this order, from inside to outside, the base layer or the cylinder core, the first compressible layer, a first further interlayer, the filling layer, the interlayer, the second compressible layer, a second further interlayer and the hard outer layer.

The cylinder may comprise at least one channel which is disposed in its interior and which communicates with openings on the lateral surface of the cylinder, and/or with openings or connections on an end face of the cylinder, and/or, if the cylinder is designed as a hollow cylinder having a base layer, with openings on an inside or on an end face of the hollow cylinder. The at least one channel in this case is disposed preferably parallel to the cylinder axis.

For example, a cylinder configured as a solid cylinder comprises, on one end face, a connection for compressed air, which communicates via the at least one channel with openings on the lateral surface of the cylinder. A cylinder of this kind may be configured in particular as a printing forme cylinder. The compressed air emerging on the lateral surface facilitates the mounting of one or more hollow cylinders, for example of a further adaptor sleeve or of a printing sleeve. The openings in the lateral surface may be designed in the form of one or more round, slitted or angular openings in the outer layer, or as porous material, or as a material having a high proportion of openings.

A cylinder configured as a hollow cylinder may have, on its inside, for example, openings which communicate via the at least one channel with openings on the external lateral surface of the cylinder. The openings on the inside of the hollow cylinder may serve as a gas inlet. In this way, compressed air provided from a printing forme cylinder can be conducted to the openings on the outside. A hollow cylinder of this kind may be configured in particular as an adaptor sleeve.

The gas inlet or the openings on the inside of the hollow cylinder may in this case be designed in the form of one or more round, slitted or angular openings in the base layer, or as porous material, or as a material having a high proportion of openings. The gas inlet in this case is located preferably in the first third, as viewed along the lengthwise direction of the adaptor sleeve, of one side of the adaptor sleeve, and this side is preferably the side which faces a user.

If compressed air is guided to the surface of the outside of the adaptor sleeve, this facilitates the mounting of one or more further hollow cylinders, for example of a further adaptor sleeve or of a printing sleeve. The openings on the outside of the adaptor sleeve may be designed, for example, in the form of one or more round, slitted or angular openings in the outer layer, or as porous material, or as a material having a high proportion of openings.

In order to give a region a porous and gas-permeable configuration, it is possible to use not only porous materials but also materials having a high proportion of openings per unit area. Such materials may have sieve-like, grille-like, fin-like or slitted openings.

The at least one channel may be disposed in the filling layer. In that case the channel may be designed, for example, in the form of a bore or a slit in the filling layer and may preferably run axially, in other words parallel to the axis of the cylinder. Moreover, the channel may be configured in the form of a hose, which is embedded in the filling layer. In further embodiments, the at least one channel may also be disposed in one or more of the other layers of the cylinder. In order to connect the channel to openings in the cylinder, there may be one or more radial bores provided.

The cylinder has a layer structure with a plurality of layers, which are elucidated below.

Base Layer/Interlayer(s)

On configuration of the cylinder, the base layer closes off the cylinder to the inside. The base layer gives the cylinder stability and represents the basis for the application of further layers of the layer system. Where the cylinder is a solid cylinder, a cylinder core is used instead of a base layer.

The material of the base layer, of the interlayer and/or of the at least one further interlayer is preferably a fibre-reinforced plastic.

The plastic in this case is preferably selected from the group encompassing polyesters, polyamides, polyurethanes, epoxides, phenolic resins, unsaturated polyester resins, vinyl ester resins, phenol-formaldehyde resins, diallyl phthalate resins, (meth)acrylate resins, amino resins, melamine resins, urea resins and combinations thereof.

The fibres used for reinforcing the plastic are preferably selected from the group encompassing glass fibres, ceramic fibres, carbon fibres and combinations thereof.

Suitable fibres are especially those having a tensile elasticity modulus of at least 50 GPa, with customary fibres used for reinforcing plastics having a tensile elasticity modulus in the range from around 60 GPa to about 700 GPa.

Examples of suitable polymeric fibres are, in particular, polyamide fibres, polyaramid fibres, polyimide fibres, polyethylene fibres and polyurethane fibres.

The base layer, the interlayer and/or the at least one further interlayer have preferably a thickness in the range from 0.5 mm to 5 mm. More preferably the thickness is in the range from 0.7 mm to 4 mm, very preferably in the range from 0.9 mm to 4 mm and most preferably in the range from 1 mm to 2 mm.

Especially when the cylinder is configured as an adaptor sleeve or as a printing sleeve, the thickness of the base layer is preferably less than 1 mm. The effect achieved by this is that the base layer can be expanded by exposure to a force, through compressed air, for example. The expansion of the base layer increases the internal diameter of the hollow cylinder, thereby advantageously facilitating its engagement on another adaptor sleeve or on a printing forme cylinder.

The base layer, the interlayer and/or the at least one further interlayer has preferably a hardness in the range from 60 Shore D to 99 Shore D. More preferably the hardness is in the range from 65 Shore D to 95 Shore D, very preferably in the range from 70 Shore D to 95 Shore D and most preferably in the range from 80 Shore D to 95 Shore D.

The base layer, the interlayer and/or the at least one further interlayer has preferably an elasticity modulus in the range from 10 GPa to 1000 GPa. The elasticity modulus more preferably is in the range from 20 GPa to 900 GPa, very preferably in the range from 30 GPa to 800 GPa and most preferably in the range from 40 GPa to 640 GPa. This statement of the elasticity modulus refers to a measurement along a direction which corresponds substantially to the orientation of the fibres in the plastic.

The base layer, the interlayer and/or the at least one further interlayer has preferably a density in the range from 0.9 g/cm$^3$ to 3 g/cm$^3$. More preferably the density is in the range from 1 g/cm$^3$ to 2.8 g/cm$^3$, very preferably in the range from 1.1 g/cm$^3$ to 2.4 g/cm$^3$ and most preferably in the range from 1.1 g/cm$^3$ to 2.1 g/cm$^3$.

Cylinder Core

If the cylinder is implemented as a solid cylinder, the cylinder core forms the basis for the further layers of the layer structure of the cylinder. The cylinder core may be implemented in solid form or alternatively may also have cavities.

Suitable materials for the cylinder core are, for example, fibre-reinforced materials, steel, stainless steel, copper, aluminium, chromium, alloys and/or composites thereof, or combinations of these.

First/Second Compressible Layer

The compressible layers in the cylinder enable the cylinder to accommodate compressive forces acting on the cylinder. The compressible layers additionally have a damping effect on cylinder vibrations. The first compressible layer serves in particular for compensating expansions on the part of the underlying layers.

The material of the first compressible layer and/or of the second compressible layer is preferably selected from the group encompassing elastic solid materials, elastic foams, materials filled with hollow spheres, and combinations of these materials.

The elastic material is selected, for example, from a rubber, a latex, an ethylene-propylene-diene rubber, a styrene-butadiene copolymer, a styrene-isoprene copolymer, a polyurethane, a polyether-amide, a silicone rubber or combinations thereof. An example of a suitable latex is polyester-urethane rubber. The elastic foam is selected, for example, from the group encompassing polyurethane foam, polyester-urethane foam, epoxy foam, silicone foam and combinations of two or more of these foams.

The first compressible layer and/or the second compressible layer preferably has a thickness in the range from 0.1 mm to 10 mm. More preferably the thickness is in the range from 0.5 mm to 4 mm, very preferably in the range from 0.7 mm to 4 mm and most preferably in the range from 1 mm to 3.5 mm.

The first compressible layer and/or the second compressible layer preferably has a hardness in the range from 15 Shore A to 80 Shore A. More preferably the hardness is in the range from 10 Shore A to 70 Shore A, very preferably in the range from 25 Shore A to 60 Shore A and most preferably in the range from 25 Shore A to 50 Shore A.

The first compressible layer and/or the second compressible layer preferably has a density in the range from 0.1 g/cm$^3$ to 1.2 g/cm$^3$. More preferably the density is in the range from 0.1 g/cm$^3$ to 1.1 g/cm$^3$, very preferably in the range from 0.1 g/cm$^3$ to 1 g/cm$^3$ and most preferably in the range from 0.2 g/cm$^3$ to 0.9 g/cm$^3$.

The first compressible layer and/or the second compressible layer preferably has the lowest elasticity modulus of all layers of the cylinder.

Filling Layer

The filling layer of the cylinder can be used to adjust the outer diameter of the cylinder to a mandated value. If a large cylinder diameter is required, the thickness of the filling layer can be increased accordingly, and, conversely the thickness of the filling layer can be reduced if a small cylinder diameter is necessary.

The material of the filling layer is preferably a rigid foam.

The filling layer preferably has a density in the range from 0.05 g/cm$^3$ to 0.8 g/cm$^3$. More preferably the density is in the range from 0.1 g/cm$^3$ to 0.8 g/cm$^3$, very preferably in the range from 0.1 g/cm$^3$ to 0.7 g/cm$^3$ and most preferably in th range from 0.2 g/cm$^3$ to 0.6 g/cm$^3$.

The rigid foam is preferably a polyurethane foam, an epoxy foam, a silicone foam, a polyethylene foam, a polystyrene foam, a polyethene terephthalate foam. The rigid foam preferably has a low density, which is preferably in the range from 0.05 g/cm$^3$ to 0.8 g/cm$^3$.

The filling layer preferably has a thickness in the range from 1 mm to 200 mm. More preferably the thickness is in the range from 1 mm to 180 mm, very preferably in the range from 2 mm to 150 mm and most preferably in the range from 4 mm to 100 mm.

The filling layer preferably has a hardness in the range from 10 Shore D to 60 Shore D. More preferably the hardness is in the range from 20 Shore D to 55 Shore D, very preferably in the range from 35 Shore D to 45 Shore D and most preferably in the range from 30 Shore D to 45 Shore D.

Outer Layer

The outer layer closes off the cylinder to the outside and provides the surface on which further cylinders can be accommodated. The surface of the outer layer may have a rough or smooth configuration, and preferably is extremely smooth, in order to allow hollow cylinders to be slid on easily. The outer layer is preferably dimensionally stable or hard.

The material of the outer layer is preferably selected from the group encompassing metals, ceramic, unreinforced plastics, reinforced plastics and combinations of two or more of these materials.

Examples of suitable plastics for the outer layer, which may also be reinforced with fibres, include polyurethane, epoxy, polyester, polyamide, polyvinyl ester, polyethylene, polystyrene, polyethene terephthalate and acrylonitrile-butadiene-styrene copolymer.

The fibres used for reinforcing the plastic of the outer layer are preferably selected from the group encompassing glass fibres, ceramic fibres, carbon fibres and combinations thereof. Particularly suitable, furthermore, are the fibres described in connection with the base layer.

The outer layer preferably has an elasticity modulus in the range from 0.1 GPa to 10 GPa. More preferably the elasticity modulus is in the range from 0.5 GPa to 8 GPa, very preferably from 1 GPa to 7 GPa and most preferably from 1 GPa to 5 GPa.

The thickness of the outer layer is preferably in the range from 0.1 mm to 50 mm. More preferably the thickness is in the range from 0.5 mm to 30 mm, very preferably from 0.7 mm to 20 mm and most preferably in the range from 1 mm to 15 mm.

The outer layer preferably has a hardness in the range from 60 Shore D to 99 Shore D. More preferably the hardness is in the range from 70 Shore D to 95 Shore D, very preferably in the range from 80 Shore D to 95 Shore D and most preferably in the range from 85 Shore D to 95 Shore D.

Layer Structure

The individual layers of the layer structure of the cylinder border one another preferably directly. An alternative possibility is to dispose an adhesion promoter or an adhesive between two layers in order to improve the adhesion between the layers.

In the layer structure it is preferable for the thicknesses of the individual layers to be selected such that the ratio between the sum of the thicknesses of the base layer, the interlayers and the outer layer to the sum of the thicknesses of the compressible layers is in the range from 0.01 to 400 and more preferably in the range from 0.1 to 100. Additionally or alternatively it is preferable for the ratio of the thickness of the first compressible layer to the second compressible layer to be selected in the range from 0.1 to 10 and more preferably in the range from 0.3 to 3.

The hardnesses of the first compressible layer and of the second compressible layer are preferably selected such that these layers are softer than the base layer or the cylinder core, the interlayers and the outer layer.

Preferably the hardness of the compressible layers is less than the hardness of the filling layer, the hardness of the filling layer is less than or equal to the hardness of the base layer or the cylinder core and the interlayers, and the outer layer may have the greatest hardness of all the layers. The hardest layers are preferably the fibre-reinforced layers.

The proposed cylinder with the proposed layer structure has good vibration properties. Important factors for the vibration properties of the cylinder are the frequencies at which resonances occur and also the extent thereof. Also important are the damping properties of the cylinder, so that cylinder vibrations are strongy damped and therefore their amplitude is limited and the cylinder is suitable for use at high printing speeds. The cylinder, moreover, preferably exhibits no resonances having a frequency which can be stimulated in printing operation.

Where a resonance of a cylinder is below 600 Hz, a deflection of the vibration of the cylinder for printing speeds of 500 m/min or more is from experience great enough to allow it to be visible in printing. To enable high printing speeds, resonances of the cylinder preferably have a frequency which is greater than 900 Hz.

Furthermore, the cylinder exhibits strong damping of jolts acting on the cylinder. It is preferable here if resonant vibrations of the cylinder, on excitation with a testing hammer having a mass of 390 g, a length to the fulcrum of 245 mm and a deflection of 30°, exhibit at most an acceleration value of 3 m/s$^2$.

Cylinder vibrations decay exponentially because of damping. An envelope of a vibration A(t) of the cylinder that describes the decay behaviour may therefore be described by the equation $$A(t)=A_0 e^{-dt}$$

where $A_0$ is the amplitude of the vibration at time t=0 and d is the decay constant. The cylinder in this case is preferably configured such that the decay constant d has a value of $0.15<d<0.95$.

If the decay constant d is less than 0.15, resonances are perceptible at certain speeds in the printing test. If d is greater than 0.95, a cylinder configured as an adaptor sleeve is observed to exhibit more vibrations with increasing speed.

A further aspect of the invention relates to an arrangement comprising one of the hollow cylinders described herein and also at least one further of the hollow cylinders described herein, disposed on the lateral surface of the hollow cylinder. Additionally or alternatively to a further hollow cylinder disposed on the lateral surface of the hollow cylinder, one of the printing forme cylinders described or an additional one of the hollow cylinders described herein may be disposed in the interior of the hollow cylinder.

The invention further relates to an arrangement wherein a printing sleeve is disposed on the lateral surface of one of the cylinders described herein or on the lateral surface of the outermost cylinder of the arrangement described herein.

Examples of arrangements according to the invention include in particular an arrangement with a printing forme cylinder, an adaptor sleeve disposed thereon and a printing sleeve disposed thereon. Further examples include an adaptor sleeve with a printing sleeve disposed thereon, and a printing forme cylinder with adaptor sleeve disposed thereon.

Figure 1:
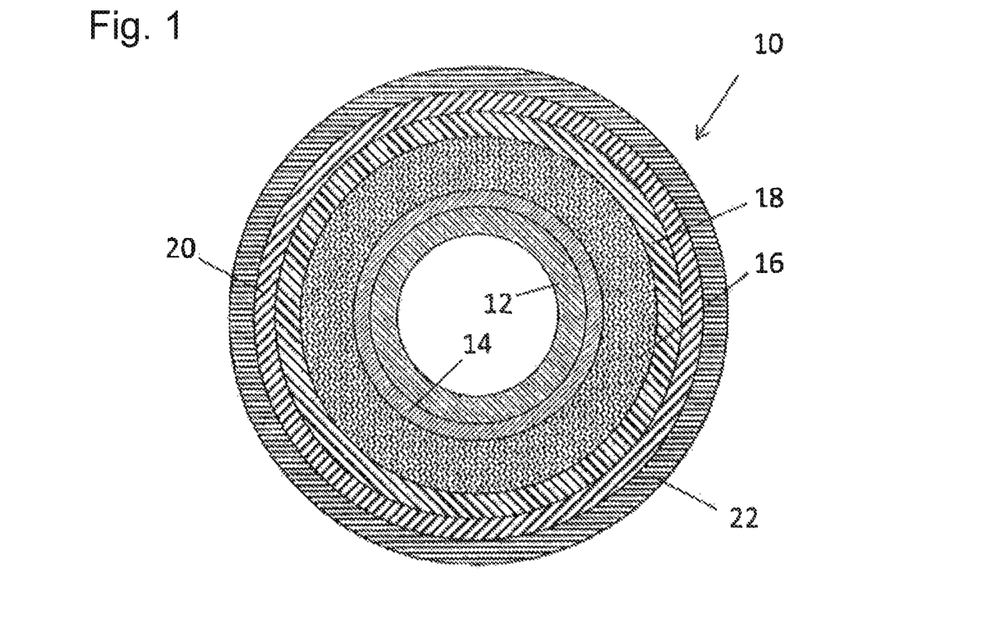
FIG. 1 shows a hollow cylinder having a layer structure in a sectional view.

FIG. 1 shows a cylinder 10 implemented as a hollow cylinder. The cylinder 10 has a layer structure which has, in this order from inside to outside, a base layer 12, a first compressible layer 14, a filling layer 16, an interlayer 18, a second compressible layer 20 and an outer layer 22.

In other embodiments, the cylinder 10 may also be configured as a solid cylinder, in which case a cylinder core is used instead of the base layer 12. Furthermore, there may optionally be further interlayers disposed in each case between the first compressible layer and the filling layer and between the second compressible layer and the outer layer.

Figure 2:
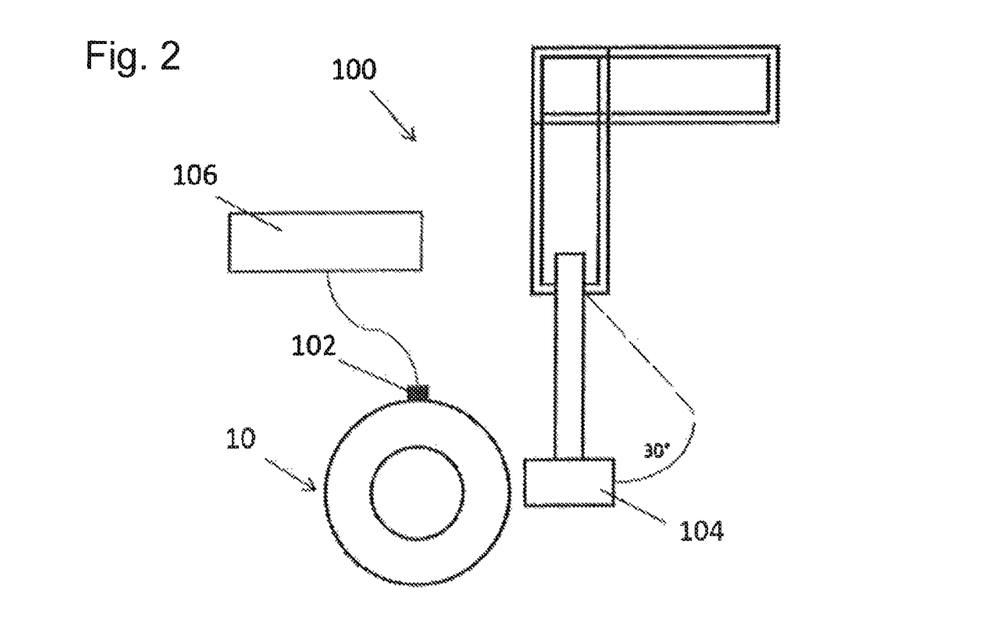
FIG. 2 shows a schematic representation of a measuring arrangement for ascertaining the vibration behaviour of a (hollow) cylinder.
Figure 3:
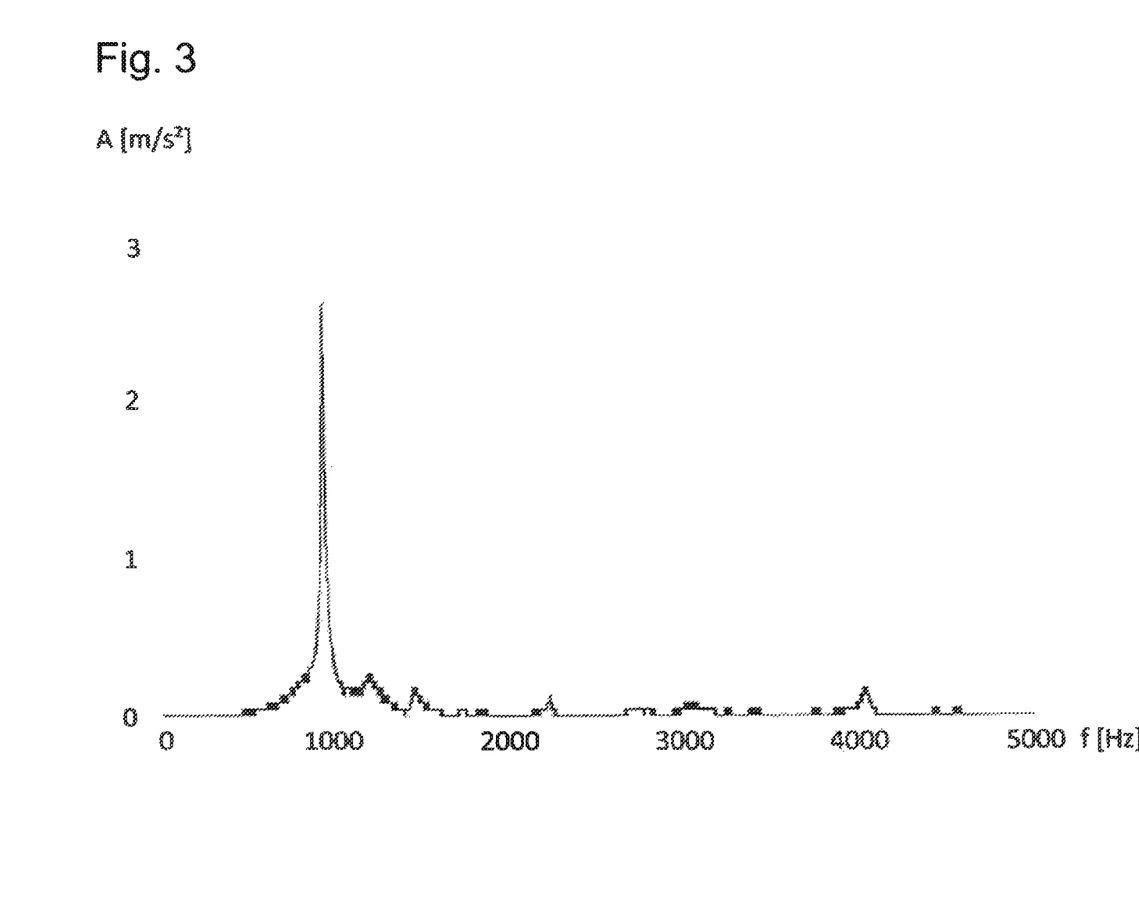
FIG. 3 shows a spectrum of the vibrations of a (hollow) cylinder.

FIG. 2 shows a measuring arrangement 100 for studying the vibration behaviour of a cylinder 10. The vibration behaviour of the cylinder 10 here is determined in particular by the frequencies at which resonances occur. Moreover, the respective extent of a resonance is important for the properties of the cylinder.

To determine the item, in other words the frequency of a resonance, and the extent thereof, the cylinder 10 being studied is inserted into the measuring arrangement 100. A measuring sensor 102 is secured on the cylinder 10. The measuring arrangement 100 further comprises a hammer 104 for the controlled stimulation of the cylinder 10 with a defined jolt.

The measuring sensor 102 is configured, for example, as an acceleration sensor and is set up to measure vibrations stimulated in the cylinder 10 after a jolt. For this purpose, the measurement data of the measuring sensor 102 are transmitted to a measuring unit 106, where they are stored and analysed.

EXAMPLES

Pendulum Impact Tests

For a measurement using the measuring arrangement 100 described with reference to FIG. 2, a hollow cylinder configured as an adaptor sleeve is engaged over a fitting steel cylinder. The measuring sensor 102 is secured at ¼ of the length of the adaptor at 12 o'clock, i.e. on the top side. At 3 o'clock, i.e. at an offset of 90° to the measuring sensor 102, a strike is made with the hammer 104 at the same length position. This strike would influence the measurement. The hammer 104 has a mass of 390 g and a length to the fulcrum of 245 mm. For a defined jolt on the cylinder 10, the hammer 104 is deflected by 30 degrees and then released. The head of the hammer 104 consists of rigid plastic, so that the cylinder 10 under measurement is not damaged.

The following trials were performed using the VIBXpertII instrument with the Omnitrend software version 2.91 (DB Prüftechnik) and the fitting measuring sensor IPC100 mV/g (DB Prüftechnik), the measuring sensor being secured with wax on the cylinder being studied.

The resonance frequencies are measured by capture of the time profile of the acceleration due to the hammer blow, measured by the measuring sensor 102. The time signal is subsequently subjected to a frequency analysis by the measuring unit 106, by means of Fourier transformation or numerical transformations, for example.

The resonances of the cylinder are measured via a fivefold measurement in the frequency range from 2 Hz to 6400 Hz with a resolution of 0.25 Hz by way of a strike test. The time profile or the decay of the vibrations is measured with a single measurement over the entire frequency range from 1 Hz to 10 000 Hz with a sampling rate of 65.5 kHz and over a time of 450 ms via the acceleration measurement.

The time profile looks at how quickly the vibration decays. The measured values of the time profile are analysed for this purpose.

The enveloping exponential function $$A(t) = A_0 e^{-dt}$$

is fitted to the measurement values themselves by curve fitting. In this case the amplitude $A_0$ is the maximum acceleration at the time t=0. The decay constant d determines how quickly the exponential function falls, with the exponential function falling more quickly as d becomes greater. The smaller $A_0$ is and the quicker the exponential function falls, the greater the damping in the cylinder.

Figure 4:
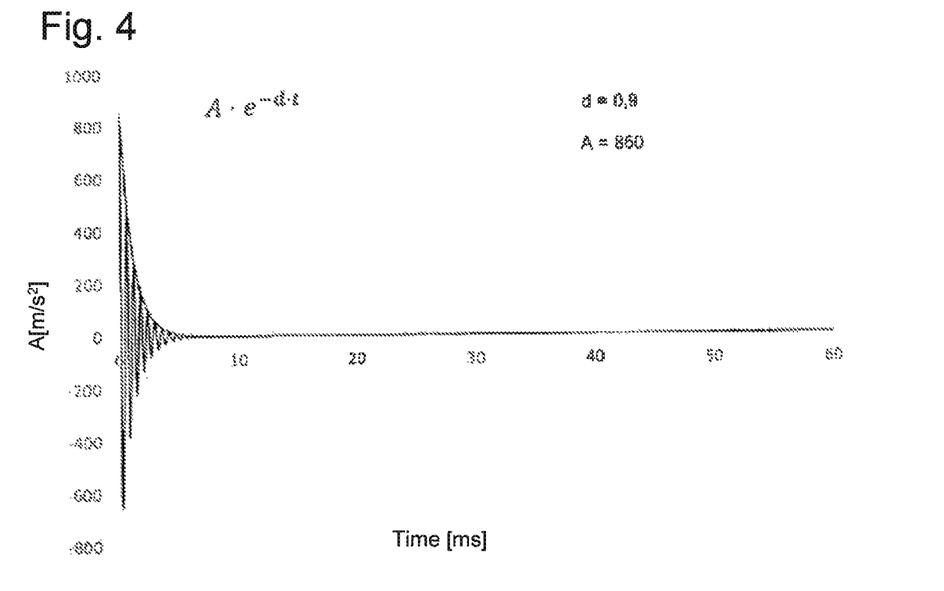
FIG. 4 shows a diagram of the decay behaviour of a first (hollow) cylinder.
Figure 5:
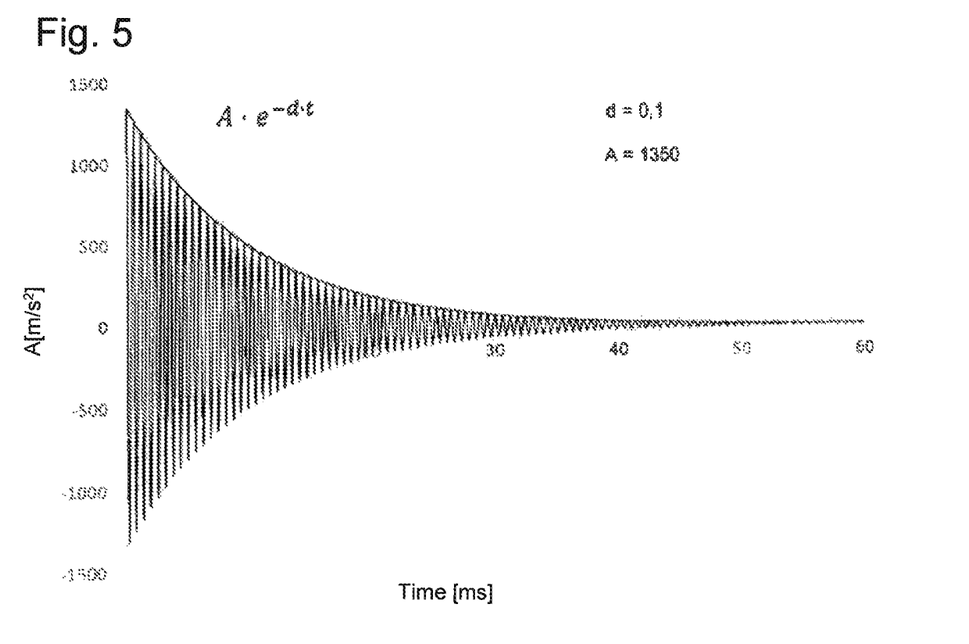
FIG. 5 shows a diagram of the decay behaviour of a second (hollow) cylinder.

FIGS. 4 and 5 show examples of acceleration measurements in the time range. Plotted on the Y axis in each case is the acceleration A in m/s$^2$, and on the X axis the time t in ms.

FIG. 4 shows a first example of an acceleration measurement on a first cylinder configured as an adaptor sleeve. The first adaptor sleeve has a high decay constant d of 0.9, and the measured acceleration at the starting time of the measurement was 850 m/s$^2$.

FIG. 5 shows a second example of an acceleration measurement on a second cylinder configured as an adaptor sleeve. The second adaptor sleeve has a high decay constant d of 0.1, and the measured acceleration at the starting time of the measurement was 1350 m/s$^2$.

As can be seen from the representation in FIGS. 4 and 5, the vibration of the first adaptor sleeve decays more rapidly than in the case of the second adaptor sleeve, owing to the greater decay constant d.

Printing Tests

In addition the cylinders produced were trialled on a printing machine and the printed image obtained evaluated. For these trials, the printing machine used was a Soma Optima 2 equipped with corona treatment (Soma spol. s r.o.), Flexcell NX printing plates with a thickness of 1.12 mm (Kodak) and FlexPrint MV magenta ink (Flint Group), BOPP with 20 μm thickness and 1300 mm width. The printing result was assessed at printing speeds of 375 m/min and 500 m/min. Here, the printing result ought to be good overall and additionally there ought to be only slight differences occurring between web centre and web edges. In the case of highly vibrating cylinders, large differences have been observed between middle and edge. Results are assessed as + if good (little vibration), as – if poor, and as 0 for results in between.

For the measurements listed below in Table 2, various cylinders of the invention and comparative examples with different layer sequences were produced and were studied in accordance with the above-described measurement and evaluation. Table 1 describes their construction.

Here, the abbreviation PEUR denotes a polyester-urethane rubber having a density of around 400 kg/m3, a tensile strength of >3.5 N/mm$^2$ and an elongation at break of >330%. The abbreviation GRP denotes a glass fibre-reinforced polyester resin and CRP denotes a carbon fibre-reinforced polyester resin.

TABLE 1

| Adaptor No. | Hollow | Base layer | 1$^{st}$ compressible layer | 1$^{st}$ further interlayer | Filling layer | Interlayer | 2$^{nd}$ compressible layer | 2$^{nd}$ further interlayer | Outer layer |
|---|---|---|---|---|---|---|---|---|---|
| Inventive 1 | no | 1 mm GRP | 2 mm PEUR | 1.2 mm GRP | 13 mm PU foam | 0.4 mm GRP | 3 mm PEUR | 4.8 mm CRP | 1 mm PU |

TABLE 1-continued

| Adaptor No. | Hollow | Base layer | 1st compressible layer | 1st further interlayer | Filling layer | Interlayer | 2nd compressible layer | 2nd further interlayer | Outer layer |
|---|---|---|---|---|---|---|---|---|---|
| Inventive 2 | no | 1 mm GRP | 2 mm PEUR | 1.2 mm GRP | 16 mm PU foam | 1.2 mm GRP | 3 mm PEUR | 1.2 mm GRP | 1.5 mm PU |
| Inventive 3 | yes | 1 mm GRP | 2 mm PEUR | 1.2 mm GRP | 16 mm PU foam | 1.2 mm GRP | 1 mm PEUR | 4.8 mm CRP | 2 mm PU |
| Inventive 4 | yes | 1 mm GRP | 2 mm PEUR | 1.2 mm GRP | 15 mm PU foam | 1.2 mm GRP | 2 mm PEUR | 4.8 mm CRP | 2 mm PU |
| Inventive 5 | no | 1 mm GRP | 2 mm PEUR | — | 16 mm PU foam | 1.2 mm GRP | 3 mm PEUR | — | 1.5 mm PU |
| Inventive 6 | no | 1 mm GRP | 2 mm PEUR | 1.2 mm GRP | 16 mm PU foam | 1.2 mm GRP | 3 mm PEUR | — | 1.5 mm PU |
| Comparative 1 | no | 1 mm GRP | 3 mm PEUR | 1.2 mm GRP | 12 mm PU foam | 0.4 mm GRP | — | 4.8 mm CRP | 1 mm PU |
| Comparative 2 | yes | 1 mm GRP | 3 mm PEUR | 1.2 mm GRP | 12 mm PU foam | — | — | 4.8 mm CRP | 1 mm PU |
| Comparative 3 | no | 1 mm GRP | 1 mm PEUR | 1.5 mm GRP | 16 mm PU foam | 0.4 mm GRP | — | 4.8 mm CRP | 1 mm PU |
| Comparative 4 | no | 1 mm GRP | 2 mm PEUR | 1.2 mm GRP | 15 mm PU foam | 0.4 mm GRP | — | 4.8 mm CRP | 1 mm PU |

TABLE 2

| Cylinder No. | Time profile acceleration at ¼ of the length | | Printing results | |
|---|---|---|---|---|
| | d | A | 375 m/min | 500 m/min |
| Inventive 1 | 0.9 | 850 | + | + |
| Inventive 2 | 0.65 | 600 | + | + |
| Inventive 3 | 0.2 | 1100 | + | + |
| Inventive 4 | 0.16 | 1050 | | |
| Inventive 5 | 0.92 | 400 | | |
| Inventive 6 | 0.58 | 250 | | |
| Comparative 1 | 1.05 | 750 | − | − |
| Comparative 2 | 0.07 | 1100 | − | − |
| Comparative 3 | 1.8 | 550 | − | − |
| Comparative 4 | 1.9 | 800 | − | − |

LIST OF REFERENCE NUMERALS

10 cylinder
12 base layer
14 first compressible layer
16 filling layer
18 interlayer
20 second compressible layer
22 outer layer
100 measuring arrangement
102 measuring sensor
104 hammer
106 measuring unit

The invention claimed is:

1. A hollow cylinder, the cylinder having a layer structure which comprises in this order, from inside to outside,
a base layer or a cylinder core,
a first compressible layer of an elastic material,
a filling layer,
a first interlayer,
a second compressible layer of an elastic material,
a second interlayer and
an outer layer,
the outer layer forming a lateral surface of the cylinder,
wherein the hardness of the first compressible layer and the hardness of the second compressible layer are less than the hardness of the base layer, the filing layer, the interlayers and the outer layer.

2. The cylinder according to claim 1, wherein the cylinder has at least one further interlayer, the at least one further interlayer being disposed between the first compressible layer and the filling layer.

3. The cylinder according to claim 2, wherein
the elastic material of the first compressible layer is an ethylene-propylene-diene rubber, a styrene-butadiene copolymer, a styrene-isoprene copolymer, a polyether-amide, a silicone rubber or combinations thereof and
the elastic material of the second compressible layer is an ethylene-propylene-diene rubber, a styrene-butadiene copolymer, a styrene-isoprene copolymer, a polyether-amide, a silicone rubber or combinations thereof.

4. The cylinder according to claim 1, wherein the cylinder comprises at least one channel which is disposed in its interior and which communicates with openings on the lateral surface of the cylinder and/or with openings or connections on an end face of the cylinder and/or, if the cylinder is designed as a hollow cylinder having a base layer, with openings on an inside or on an end face of the hollow cylinder.

5. The cylinder according to claim 1, wherein the material of the base layer and/or of the first interlayer is a fibre-reinforced plastic.

6. The cylinder according to claim 1, wherein the first compressible layer and/or the second compressible layer has a thickness in the range from 0.1 mm to 10 mm.

7. The cylinder according to claim 1, wherein the ratio between the sum of the thicknesses of the base layer, the first interlayer and the second interlayer and the outer layer to the sum of the thicknesses of the compressible layers is in the range from 0.01 to 400.

8. The cylinder according to claim 1, wherein the ratio of the thickness of the first compressible layer (14) to the thickness of the second compressible layer (20) is in the range from 0.1 to 10.

9. The cylinder according to claim 1, wherein the outer layer has a thickness in the range from 0.1 mm to 50 mm.

10. The cylinder according to claim 1, wherein on excitation with a testing hammer having a mass of 390 g, a length to the fulcrum of 245 mm and a deflection of 30°, resonant vibrations of the cylinder have at most an acceleration value of 3 m/s$^2$.

11. The cylinder according to claim 1, wherein vibrations of the cylinder decay exponentially, with a decay constant d having a value of $0.15<d<0.95$.

12. The cylinder according to claim 1, wherein the cylinder is a printing forme cylinder.

13. An arrangement comprising the cylinder according to claim 12 and a printing sleeve disposed on a lateral surface of the cylinder.

14. The cylinder according to claim 1, wherein the cylinder is a hollow cylinder forming an adaptor sleeve or a printing sleeve.

15. An arrangement comprising a first cylinder according to claim 14 and a second cylinder according to claim 14 which is disposed in the interior of the first cylinder.

16. The arrangement according to claim 15, further comprising a printing sleeve disposed on a lateral surface of the first cylinder.

17. The cylinder according to claim 1, wherein the material of the second interlayer is a fibre-reinforced plastic.

18. The cylinder according to claim 1, wherein the material of the first compressible layer and the material of the second compressible layer have a Shore A hardness in the range from 1.5 to 80.

19. A hollow cylinder, the cylinder having a layer structure which comprises in this order, from inside to outside,
   a base layer or a cylinder core,
   a first compressible layer,
   a filling layer,
   a first interlayer made of a fibre-reinforced plastic,
   a second compressible layer,
   a second interlayer made of a fibre-reinforced plastic, and
   an outer layer for accommodating further cylinders,
the outer layer forming a lateral surface of the cylinder, the outer layer being dimensionally stable,
wherein the first and the second compressible layer have an elasticity modulus lower than the elasticity modulus of any of the other layers of the cylinder.

* * * * *